(12) United States Patent  
Park et al.

(10) Patent No.: US 9,236,979 B2
(45) Date of Patent: Jan. 12, 2016

(54) APPARATUS AND METHOD FOR TRANSMITTING/RECEIVING CONTROL INFORMATION IN A WIRELESS COMMUNICATION SYSTEM THAT SUPPORTS CARRIER AGGREGATION

(75) Inventors: Kyu Jin Park, Anyang-si (KR); Han Gyu Cho, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 676 days.

(21) Appl. No.: 13/636,057

(22) PCT Filed: Mar. 21, 2011

(86) PCT No.: PCT/KR2011/001924
§ 371 (c)(1),
(2), (4) Date: Sep. 19, 2012

(87) PCT Pub. No.: WO2011/115463
PCT Pub. Date: Sep. 22, 2011

(65) Prior Publication Data
US 2013/0010684 A1 Jan. 10, 2013

Related U.S. Application Data

(60) Provisional application No. 61/315,406, filed on Mar. 19, 2010.

(51) Int. Cl.
*H04W 72/00* (2009.01)
*H04L 5/00* (2006.01)
*H04W 48/16* (2009.01)
*H04W 72/12* (2009.01)
*H04W 84/04* (2009.01)
*H04W 88/08* (2009.01)

(52) U.S. Cl.
CPC .............. *H04L 5/0003* (2013.01); *H04L 5/001* (2013.01); *H04L 5/0053* (2013.01); *H04L 5/0091* (2013.01); *H04W 48/16* (2013.01); *H04W 72/1273* (2013.01); *H04W 84/047* (2013.01); *H04W 88/085* (2013.01)

(58) Field of Classification Search
None
See application file for complete search history.

(56) References Cited

U.S. PATENT DOCUMENTS

2012/0163288 A1* 6/2012 Kim et al. ............. 370/315
2012/0201191 A1* 8/2012 Seo et al. .............. 370/315

OTHER PUBLICATIONS

"Component carrier indication for bandwidth extension in LTE-A", Alcatel-Lucent, R1-100411, 3GPP TSG-RAN WG1 #59bis Valencia, Spain, Jan. 22, 2010, See pp. 1-4.
"On definitions of carrier types", Ericsson, R1-100038, 3GPP TSG-RAN WG1 #59bis Valencia, Spain, Jan. 22, 2010, See chapters 2.3.1, 2.3.2, 3.
"Mapping of CIF to component carriers", R1-100041, Ericsson, 3GPP TSG-RAN WG1 #59bis Valencia, Spain, Jan. 22, 2010, See chapters 2,3.
"Carrier Aggregation Considerations for Relays", Motorola, R1-092168, 3GPP TSG RAN1 #57 San Francisco, USA, May 8, 2009, See chapter 2; figure 2.

* cited by examiner

Primary Examiner — Alex Skripnikov
(74) Attorney, Agent, or Firm — Dentons US LLP

(57) ABSTRACT

Disclosed are an apparatus and method for transmitting/receiving control information in a wireless communication system that supports carrier aggregation. According to the present invention, a processor of a base station device that transmits control information configures a component carrier type for each of a plurality of downlink component carriers (DL CCs) in accordance with whether or not each of the plurality of DL CCs can support a relay PDCCH (R-PDCCH), which is a downlink control channel dedicated to a relay node. A transmitting antenna transmits information on the type of each of the configured DL Cs to the relay node.

12 Claims, 9 Drawing Sheets (a)

(b)

(a)

(b)

(a)

(b)

APPARATUS AND METHOD FOR TRANSMITTING/RECEIVING CONTROL INFORMATION IN A WIRELESS COMMUNICATION SYSTEM THAT SUPPORTS CARRIER AGGREGATION

This Application is a 35U.S.C. §371National Stage Entry of International Application No. PCT/KR2011/001924, filed Mar. 21, 2011and claims the benefit of U.S. Provisional Application Nos. 61/315,406, filed Mar. 19, 2010, all of which are incorporated by reference in their entirety herein.

TECHNICAL FIELD

The present invention relates to a wireless communication, and more particularly, to an apparatus and method for transmitting/receiving control information in a carrier aggregation supportive wireless communication system.

BACKGROUND ART

In case that a channel status between an eNode B and a user equipment, a relay node (RN) is installed between the eNode B and the user equipment, thereby providing the user equipment with a radio channel having a better channel status. Moreover, by introducing a relay node into a cell edge area having a poor channel status from an eNode B, if the relay node is used, it may provide a faster data channel and extend a cell service area. Thus, a relay node is the technology introduced to solve the propagation shadow zone problem of a wireless communication system and is widely used.

Compared to a conventional relay node having a function limited to a function of a repeater configured to simply amplify and transmit a signal, a recent relay node is evolved into a further-intelligent form. Moreover, the relay node technology corresponds to the technology essential to service coverage extension and data throughput improvement as well as cost reductions for base station expansion and backhaul network maintenance in a next generation mobile communication system. To keep up with the ongoing development of the relay node technology, it is necessary for a new wireless communication system to support a relay node used by the related art wireless communication system.

At least one or more cells exist in a single base station (or eNode B). The cell sets a single carrier to one of bandwidths including 1.25 MHz, 2.5 MHz, 5 MHz, 10 MHz, 15 MHz, 20 MHz and the like and then provides DL/UL (downlink/uplink) service to a plurality of user equipments. In doing so, different cells may be configured to provide different bandwidths, respectively. A base station (or eNode B) transmits downlink (DL) scheduling information for downlink (DL) data to inform a corresponding user equipment of time/frequency region for transmitting data, coding, data size, HARQ (hybrid automatic repeat and request) related information and the like. The base station also transmits UL scheduling information for uplink (UL) data to the corresponding user equipment to indicate time/frequency region available for the corresponding user equipment, coding, data size, HARQ related information and the like. Moreover, an interface for user or control traffic transmission may be usable between base stations (or eNode Bs).

Wireless communication technology has been developed up to LTE based on WCDMA (wideband code division multiple access). Yet, the demand and expectation of users and service providers has increased persistently. Moreover since many ongoing efforts are made to research and develop other radio access technologies, the demand for new technology evolution is increasing to have competitive power in the future. In particular, cost reduction per bit, service availability expansion, flexible frequency band use, simple-structured open interface, reasonable power consumption of user equipment and the like are required.

Recently, ongoing standardization of the next technology of LTE is performed by 3GPP. Such technology shall be named LTE-A. Big differences between LTE system and LTE-A system may include a system bandwidth difference and an adoption of a relay node.

The goal of LTE-A system is to support maximum 100 MZ wideband. To this end, LTE-A system uses carrier aggregation or bandwidth aggregation to achieve the wideband using a plurality of frequency blocks. According to the carrier aggregation, a plurality of frequency blocks are used as one wide logical frequency band to use wider frequency band. And, a bandwidth of each frequency block may be defined based on a bandwidth of a system block used by LTE system. And, each frequency block is transmitted using a component carrier.

DISCLOSURE OF THE INVENTION

Technical Tasks

One object of the present invention is to provide a method for an eNode B to transmit control information in a carrier aggregation (CA) supportive wireless communication system.

Another object of the present invention is to provide a method for a relay node to receive control information in a carrier aggregation (CA) supportive wireless communication system.

Another object of the present invention is to provide an eNode B apparatus for transmitting control information in a carrier aggregation (CA) supportive wireless communication system.

A further object of the present invention is to provide a relay node apparatus for receiving control information in a carrier aggregation (CA) supportive wireless communication system.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of transmitting control information by an eNode B in a wireless communication system supporting carrier aggregation, may include the steps of configuring a component carrier type of each of a plurality of downlink component carriers (DL CCs) based on whether each of a plurality of the downlink component carriers supports an R-PDCCH (Relay-PDCCH) corresponding to a relay dedicated downlink control channel and transmitting information on the configured type of each of a plurality of the downlink component carriers to a relay node.

Preferably, the type of each of a plurality of the downlink component carriers may be configured cell-specifically. Preferably, the information on the type of each of a plurality of the downlink component carriers may be transmitted through a cell-specific higher layer signaling, a relay node-specific higher layer signaling or a relay node-specific L1/L2 control signaling. More preferably, the cell-specific higher layer signaling may be transmitted as a type of system information block (SIB).

To further achieve these and other advantages and in accordance with the purpose of the present invention, a method of receiving control information at a relay node in a wireless communication system supportive of carrier aggregation, may include the steps of receiving, type information of a plurality of downlink component carrier configuring types of each of the plurality of downlink component carriers (CCs) based on whether an R-PDCCH (Relay-PDCCH) corresponding to a relay dedicated downlink control channel is supportable, from an eNode B and performing a blind searching to detect the R-PDCCH or a physical downlink control channel (PDCCH) based on the type information of the plurality of the downlink component carrier type.

Preferably, the blinding searching performing step may include the step of performing the blind searching to detect the R-PDCCH from a first downlink component carrier if the first downlink component carrier among the plurality of the downlink component carriers is the downlink component carrier supportive of the R-PDCCH. Preferably, the blind searching performing step may include the step of performing the blind searching to detect the R-PDCCH from a first downlink component carrier if the first downlink component carrier among the plurality of the downlink component carriers is the downlink component carrier non-supportive of the R-PDCCH.

More preferably, the method may further include the step of receiving data from the eNode B on the first downlink component carrier based on the R-PDCCH detected from the first downlink component carrier. More preferably, the method may further include the step of receiving data from the eNode B on the first downlink component carrier based on the PDCCH detected from the first downlink component carrier.

In this case, the method may further include the step of transmitting data to the eNode B on a first uplink component carrier configured in a linkaged relation with the first downlink component carrier based on the R-PDCCH detected from the first downlink component carrier.

To further achieve these and other advantages and in accordance with the purpose of the present invention, an eNode B apparatus of transmitting control information in a wireless communication system supportive of carrier aggregation, may include a processor configured to configure a component carrier type of each of a plurality of downlink component carriers (DL CCs) based on whether each of the plurality of the downlink component carriers is supportive of an R-PDCCH (Relay-PDCCH) corresponding to a relay dedicated downlink control channel and a transmitting antenna configured to transmit information on the configured type of each of the plurality of the downlink component carriers to a relay node.

To further achieve these and other advantages and in accordance with the purpose of the present invention, a relay node apparatus, which receives control information in a wireless communication system supportive of carrier aggregation, may include a receiving antenna configured to receive, type information of a plurality of downlink component carrier configuring types of the plurality of downlink component carriers (CCs) based on whether an R-PDCCH (Relay-PDCCH) corresponding to a relay dedicated downlink control channel is supportable, from an eNode B and a processor configured to perform a blind searching to detect the R-PDCCH or a physical downlink control channel (PDCCH) based on the type information of the plurality of the downlink component carrier.

Preferably, the processor may perform the blind searching to detect the R-PDCCH from a first downlink component carrier if the first downlink component carrier among the plurality of the downlink component carriers is the downlink component carrier supportive of the R-PDCCH. Preferably, the processor may perform the blind searching to detect the R-PDCCH from a first downlink component carrier if the first downlink component carrier among the plurality of the downlink component carriers is the downlink component carrier non-supportive of the R-PDCCH.

Preferably, the relay node apparatus may further include a receiving antenna configured to receive data from the eNode B on the first downlink component carrier based on the R-PDCCH detected from the first downlink component carrier. More preferably, the relay node device may further include a receiving antenna configured to receive data from the eNode B on the first downlink component carrier based on the PDCCH detected from the first downlink component carrier.

More preferably, the relay node device may further include a transmitting antenna configured to transmit data to the eNode B on a first uplink component carrier previously configured in a linkaged relation with the first downlink component carrier based on the R-PDCCH detected from the first downlink component carrier.

Advantageous Effects

According to various embodiments of the present invention, in a carrier aggregation supportive communication system, a communication is performed in a manner of defining a component carrier type and signaling control information in accordance with the defined component carrier type, whereby communication performance is enhanced and efficient communication is enabled.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

Figure 1:
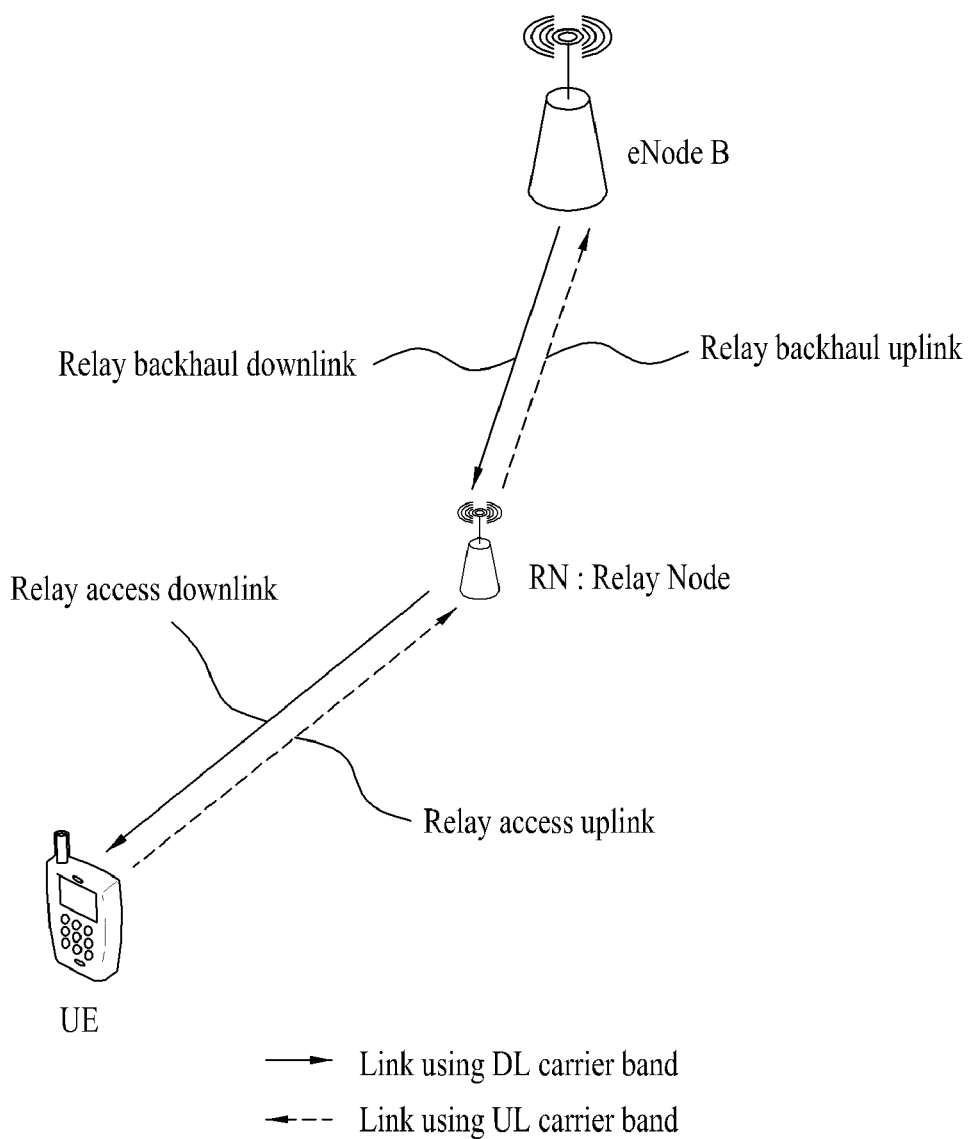
FIG. 1 is a diagram for configurations of a relay backhaul link and a relay access link in a wireless communication system.

FIG. 1 is a diagram for configurations of a relay backhaul link and a relay access link in a wireless communication system.

In 3GPP LTE-A (3$^{rd}$ Generation Partnership Project Long Term Evolution-Advanced) system, as a relay node is introduced to play a role of forwarding a linkage between an eNode B and a user equipment, links of two types differing from each other in attribute are applied to a UL carrier frequency band and a DL carrier frequency band, respectively. A connecting link part established between an eNode B and a relay node is represented in a manner of being defined as a backhaul link. If transmission is performed by FDD (frequency division duplex)) or TDD (time division duplex) using a DL resource, it may be represented as a backhaul downlink. If transmission is performed by FDD or TDD using a UL resource, it may be represented as a backhaul uplink.

On the other hand, a connection link part established between relay node and user equipment is represented in a manner of being defined as a relay access link. If transmission is performed via a relay access link using a DL frequency band (in case of FDD) or a resource of a DL subframe (in case of TDD), it may be represented as an access downlink. If transmission is performed via a relay access link using a UL frequency band (in case of FDD) or a resource of a UL subframe (in case of TDD), it may be represented as an access uplink.

A relay node (RN) may receive information from an eNode B in relay backhaul downlink or transmit information to the eNode B in relay backhaul uplink. The relay node may transmit information to a user equipment in relay access downlink or receive information from the user equipment in relay access uplink.

A relay node may be able to perform such an initial cell search as a job of matching synchronization with an eNode B and the like. To this end, the relay node may receive a synchronization channel from the eNode B, match synchronization with the eNode B, and then acquire such information as cell ID and the like. Subsequently, the relay node may be able to acquire intra-cell broadcast information by receiving a physical broadcast channel from the eNode B. Meanwhile, in the step of the initial cell search, the relay node may check a channel status of a relay backhaul downlink by receiving a relay backhaul downlink reference signal. And, the relay node may be able to obtain detailed system information by receiving R-PDCCH (Relay-Physical Downlink Control CHannel) and/or R-PDSCH (Relay-Physical Downlink Control CHannel).

Meanwhile, if an eNode B is initially accessed or a radio resource for signal transmission is absent, a relay node may perform a random access procedure. To this end, the relay node may transmit a preamble via a physical random access channel (PRACH) or the like and then receive a response message in response to the random access via R-PDCCH or a corresponding R-PDSCH.

In case of a contention based random access except a case of handover, it may be able to perform such a contention resolution procedure as a subsequent transmission of an additional physical random access channel and a subsequent R-PDCCH/R-PDSCH reception.

After completion of the above-described procedure, the relay node may perform such a general UL/DL signal transmission procedure as R-PDCCH/R-PDSCH and R-PUSCH/R-PUCCH (Relay-Physical Uplink Shared CHannel/Relay-Physical Uplink Control CHannel) transmission.

In doing so, control information, which is transmitted to the eNode B in uplink by the relay node or received from the relay node by the eNode B, may include one of ACK/NACK signal, CQI (Channel Quality Indicator), PMI (Precoding Matrix Index), RI (Rank Indicator) and the like. In case of 3GPP LTE (3$^{rd}$ Generation Partnership Project Long Term Evolution) LTE-A system, a relay node may be able to transmit such control information as CQI, PMI, RI and the like on R-PUSCH/R-PUCCH.

Figure 2:
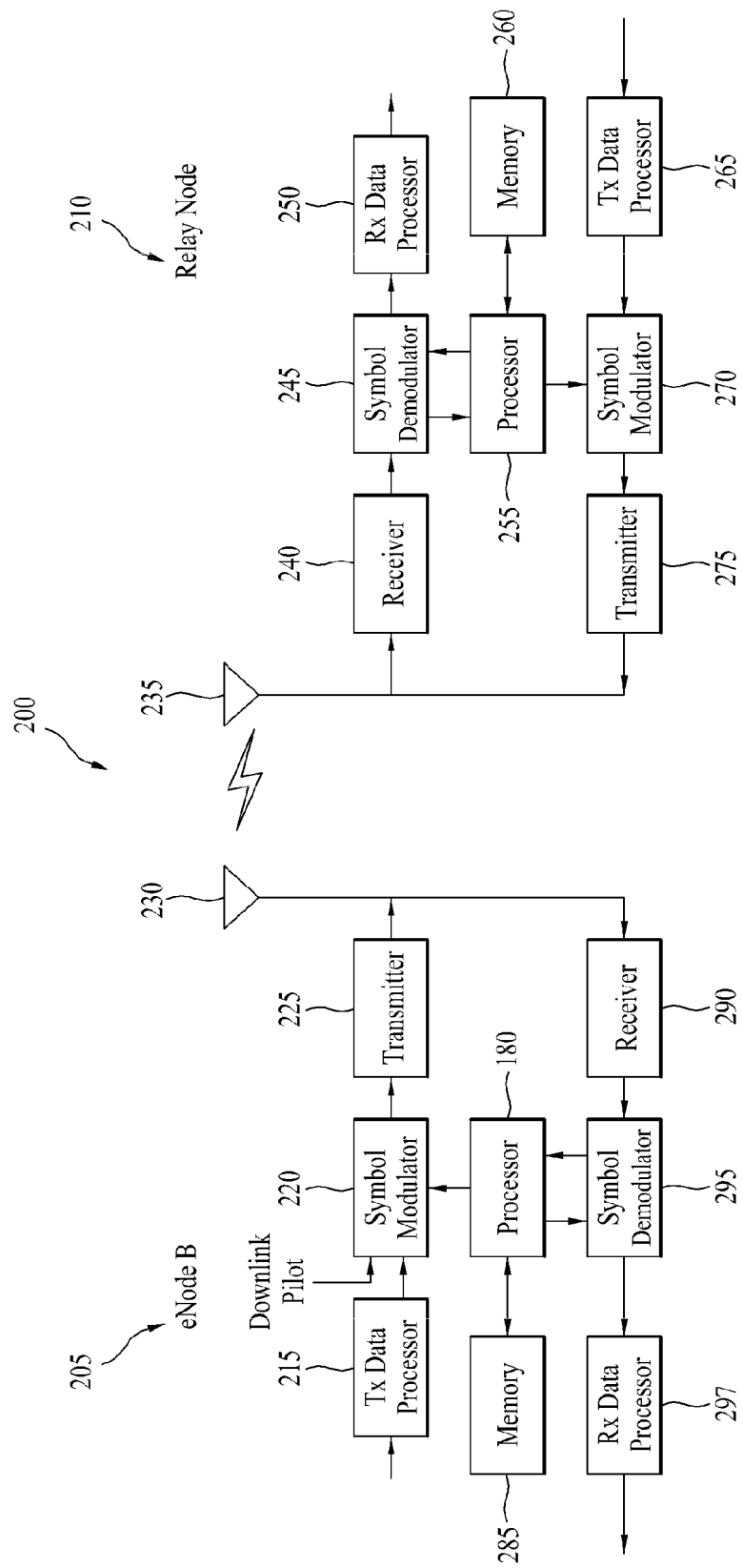
FIG. 2 is a block diagram for configurations of an eNode B 205 and a relay node 210 in a wireless communication system 200.

FIG. 2 is a block diagram for configurations of an eNode B 205 and a relay node 210 in a wireless communication system 200.

Although one eNode B 205 and one relay node 210 are shown in the drawing to schematically represent a wireless communication system 200, the wireless communication system 200 may include at least one eNode B and/or at least one relay node.

Referring to FIG. 2, an eNode B 205 may include a transmitted (Tx) data processor 215, a symbol modulator 220, a transmitter 225, a transceiving antenna 230, a processor 280, a memory 285, a receiver 290, a symbol demodulator 295 and a received data processor 297. And, a relay node 210 may include a transmitted (Tx) data processor 265, a symbol modulator 270, a transmitter 275, a transceiving antenna 235, a processor 255, a memory 260, a receiver 240, a symbol demodulator 255 and a received data processor 250. Although the eNode B/relay node 205/210 includes one antenna 230/235 in the drawing, each of the eNode B 205 and the relay node 210 includes a plurality of antennas. Therefore, each of the eNode B 205 and the relay node 210 of the present invention supports an MIMO (multiple input multiple output) system. And, the eNode B 205 according to the present invention may support both SU-MIMO (single user-MIMO) and MU-MIMO (multi user-MIMO) systems.

In downlink, the transmitted data processor 215 receives traffic data, codes the received traffic data by formatting the received traffic data, interleaves the coded traffic data, modulates (or symbol maps) the interleaved data, and then provides modulated symbols (data symbols). The symbol modulator 220 provides a stream of symbols by receiving and processing the data symbols and pilot symbols.

The symbol modulator 220 multiplexes the data and pilot symbols together and then transmits the multiplexed symbols to the transmitter 225. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 225 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the relay node via the antenna 230.

In the configuration of the relay node 210, the antenna 235 receives the downlink signal from the eNode B and then provides the received signal to the receiver 240. The receiver 240 adjusts the received signal (e.g., filtering, amplification and frequency downconverting), digitizes the adjusted signal, and then obtains samples. The symbol demodulator 245 demodulates the received pilot symbols and then provides them to the processor 255 for channel estimation.

The symbol demodulator 245 receives a frequency response estimated value for downlink from the processor 255, performs data demodulation on the received data symbols, obtains data symbol estimated values (i.e., estimated values of the transmitted data symbols), and then provides the data symbols estimated values to the received (Rx) data processor 250. The received data processor 250 reconstructs the transmitted traffic data by performing demodulation (i.e., symbol demapping, deinterleaving and decoding) on the data symbol estimated values.

The processing by the symbol demodulator 245 and the processing by the received data processor 250 are complementary to the processing by the symbol modulator 220 and the processing by the transmitted data processor 215 in the eNode B 205, respectively.

In the relay node 210 in uplink, the transmitted data processor 265 processes the traffic data and then provides data symbols. The symbol modulator 270 receives the data symbols, multiplexes the received data symbols, performs modulation on the multiplexed symbols, and then provides a stream of the symbols to the transmitter 275. The transmitter 275 receives the stream of the symbols, processes the received stream, and generates an uplink signal. This uplink signal is then transmitted to the eNode B 205 via the antenna 135.

In the eNode B 205, the uplink signal is received from the relay node 210 via the antenna 230. The receiver 290 processes the received uplink signal and then obtains samples. Subsequently, the symbol demodulator 295 processes the samples and then provides pilot symbols received in uplink and a data symbol estimated value. The received data processor 297 processes the data symbol estimated value and then reconstructs the traffic data transmitted from the relay node 210.

The processor 255/280 of the relay node/eNode B 210/205 directs operations (e.g., control, adjustment, management, etc.) of the relay node/eNode B 210/205. The processor 255/280 may be connected to the memory unit 260/285 configured to store program codes and data. The memory 260/285 is connected to the processor 255/280 to store operating systems, applications and general files.

The processor 255/280 may be called one of a controller, a microcontroller, a microprocessor, a microcomputer and the like. And, the processor 255/280 may be implemented using hardware, firmware, software and/or any combinations thereof. In the implementation by hardware, the processor 255/280 may be provided with one of ASICs (application specific integrated circuits), DSPs (digital signal processors), DSPDs (digital signal processing devices), PLDs (programmable logic devices), FPGAs (field programmable gate arrays), and the like.

In case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 255/280 or saved in the memory 260/285 to be driven by the processor 255/280.

Layers of a radio protocol between a relay node and an eNode B may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A relay node and an eNode B may be able to exchange RRC messages with each other via radio communication layer and RRC layers.

Figure 3:
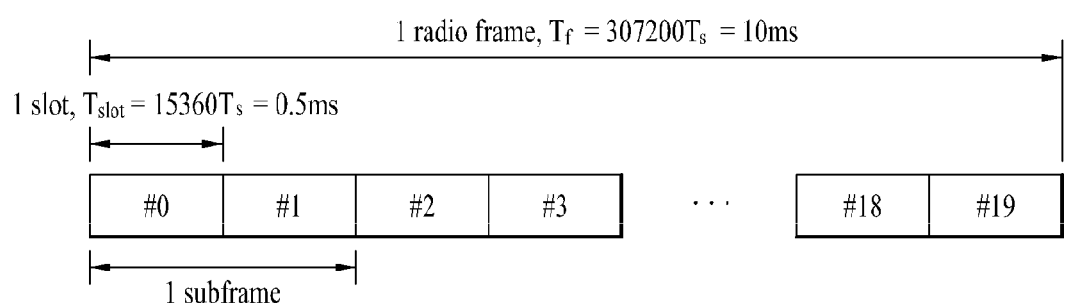
FIG. 3 is a diagram for one example of a structure of a radio frame used in 3GPP LTE system as one example of a mobile communication system.

FIG. 3 is a diagram for one example of a structure of a radio frame used in 3GPP LTE system as one example of a mobile communication system.

Referring to FIG. 3, one radio frame has a length of 10 ms ($327,200 \cdot T_s$) and is constructed with 10 subframes in equal size. Each of the subframes has a length of 1 ms and is constructed with two slots. Each of the slots has a length of 0.5 ms (15,360·$T_s$). In this case, $T_s$ indicates a sampling time and is expressed as $T_s=1/(15 \text{ kHz} \times 2,048)=3.2552 \times 10^{-8}$ (about 33 ns). The slot includes a plurality of OFDM symbols or SC-FDMA symbols in a time domain and also includes a plurality of resource blocks (RBs) in a frequency domain.

In the LTE system, one resource block (RB) includes '12 subcarriers×7 or 6 OFDM or SC-FDMA (single carrier–frequency division multiple access) symbols'. A transmission time interval (hereinafter abbreviated TTI), which is a unit time for transmitting data, can be determined by at least one subframe unit. The above-described structure of the radio frame is just exemplary. And, the number of subframes included in a radio frame, the number of slots included in a subframe and/or the number of OFDM or SC-FDMA symbols included in a slot may be modified in various ways.

Figure 4:
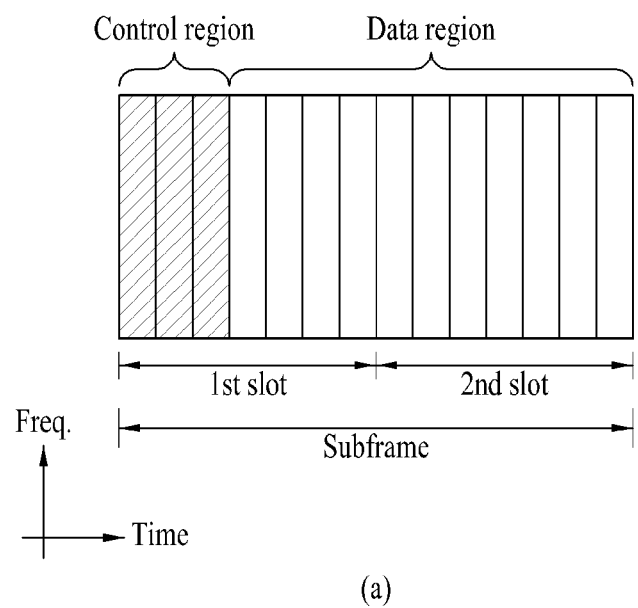
FIG. 4 is a diagram for structures of downlink and uplink subframes in 3GPP LTE system as one example of a mobile communication system.
Figure 4:
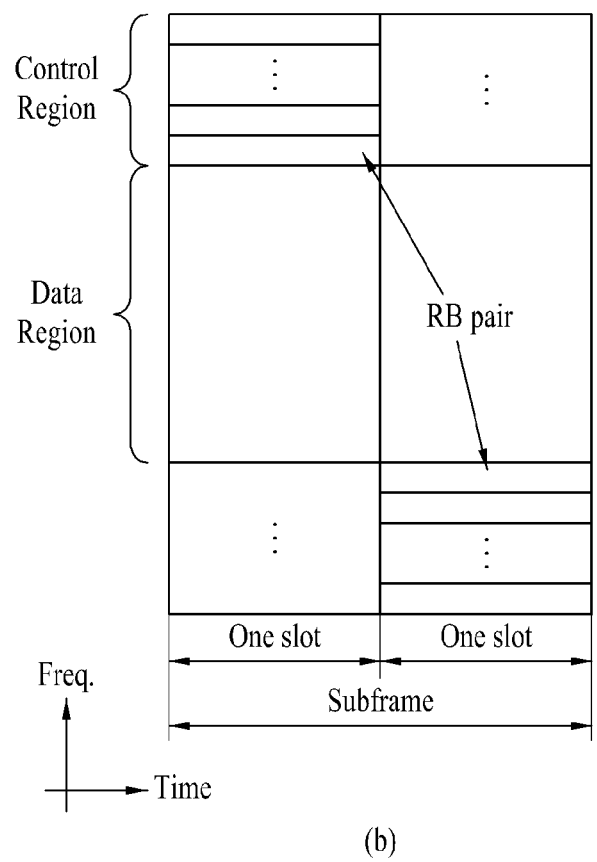

FIG. 4 is a diagram for structures of downlink and uplink subframe in 3GPP LTE system as one example of a mobile communication system.

Referring to FIG. 4 (a), one downlink (hereinafter abbreviated DL) subframe includes 2 slots in a time domain. Maximum 3 fore OFDM symbols of the first slot within the DL subframe correspond to a control region for allocating control channels thereto and the rest of the OFDM symbols correspond to a data zone for allocating PDSCH (physical downlink shared channel) thereto.

DL (downlink) control channels used in 3GPP LTE system or the like include PCFICH (physical control format indicator channel), PDCCH (physical downlink control channel), PHICH (physical hybrid-ARQ indicator channel), etc. The PCFICH carried on a first OFDM symbol carries the information on the number of OFDM symbols (i.e., a size of a control region) used for the transmission of control channels within a subframe. The control information carried on the PDCCH is called downlink control information (hereinafter abbreviated DCI). The DCI indicates a UL resource allocation information, a DL resource allocation information, a UL transmission power control command for random user equipment groups and the like. The PHICH carries ACK/NACK (acknowledgement/not-acknowledgement) signal for UL HARQ (hybrid automatic repeat request). In particular, the ACK/NACK signal for UL data transmitted by a user equipment is carried on PHICH.

In the following description, PDCCH of DL physical channel is explained.

First of all, an eNode B is able to transmit resource allocation and transmission format (this is so-called DL grant) of PDSCH, resource allocation information (this is so-called UL grant) of a physical UL shared channel, an aggregation of transmission power control commands for a random user equipment and individual user equipments in a group, activation of VoIP (voice over internet protocol) and the like via PDCCH. A plurality of PDCCHs may be transmitted within a control region and a user equipment may be able to monitor a plurality of the PDCCHs. The PDCCH is constructed with aggregation of one or several contiguous CCEs (control channel elements). The PDCCH constructed with the aggregation of one or several CCEs may be transmitted via the control region after completion of subblock interleaving. The CCE is a logical allocation unit used to provide the PDCCH with a coding rate in accordance with a status of a radio channel. The CCE corresponds to a plurality of resource element groups. The format of the PDCCH and the bit number of available PDCCH are determined in accordance with the correlation between the number of CCEs and the coding rate provided by the CCEs.

The control information carried on the PDCCH may be called DL control information (hereinafter abbreviated DCI). Table 1 shows the DCI according to DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates UL resource allocation information, DCI format 1~2 indicates DL resource allocation information, and DCI format 3 or 3A indicates a transmission power control (hereinafter abbreviated TPC) command for random UE groups.

A scheme for an eNode B to map a resource for PDCCH transmission in LTE system is schematically described as follows.

Generally, an eNode B may be able to transmit scheduling allocation information and other control informations via PDCCH. A physical control channel may be transmitted as one aggregation or a plurality of contiguous control channel elements (CCEs). In this case, one control channel element (hereinafter abbreviated CCE) includes 9 resource element groups (REGs). The number of REGs failing to be allocated to PCFICH (physical control format indicator channel) or PHICH (physical hybrid automatic repeat request indicator channel) is $N_{REG}$. The number of CCEs available for a system ranges 0 to '$N_{CCE}-1$', where $N_{CCE}=\lfloor N_{REG}/9 \rfloor$. The PDCCH supports such a multiple format as shown in Table 2. One PDCCH including n contiguous CCEs starts with a CCE that executes 'i mod n=0', where 'i' is a CCE number. Multiple PDCCHs may be transmitted in one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, an eNode B is able to determine a PDCCH format in accordance with how many regions will receive control information and the like. And, a user equipment is able to reduce overhead by reading the control information and the like by CCE unit. Likewise, a relay node may be able to read control information and the like by R-CCE unit. In LTE-A system, it may be able to map a resource element (RE) by R-CCE (relay-control channel element) unit in order to transmit R-PDCCH for a random relay node.

Referring to FIG. 4 (b), a UL subframe can be divided into a control region and a data region in a frequency domain. The control region is allocated to a physical UL control channel (PUCCH) carrying UL control information. And, the data region is allocated to a physical UL shared channel (PUSCH) for carrying user data. In order to maintain the single charier property, one user equipment does not transmit PUCCH and PUSCH simultaneously. PUCCH for one user equipment is allocated as an RB pair in one subframe. RBs belonging to the RB pair occupy different subcarriers in two slots, respectively. And, frequency hopping is performed on the RB pair allocated to the PUCCH on a slot boundary.

Figure 5:
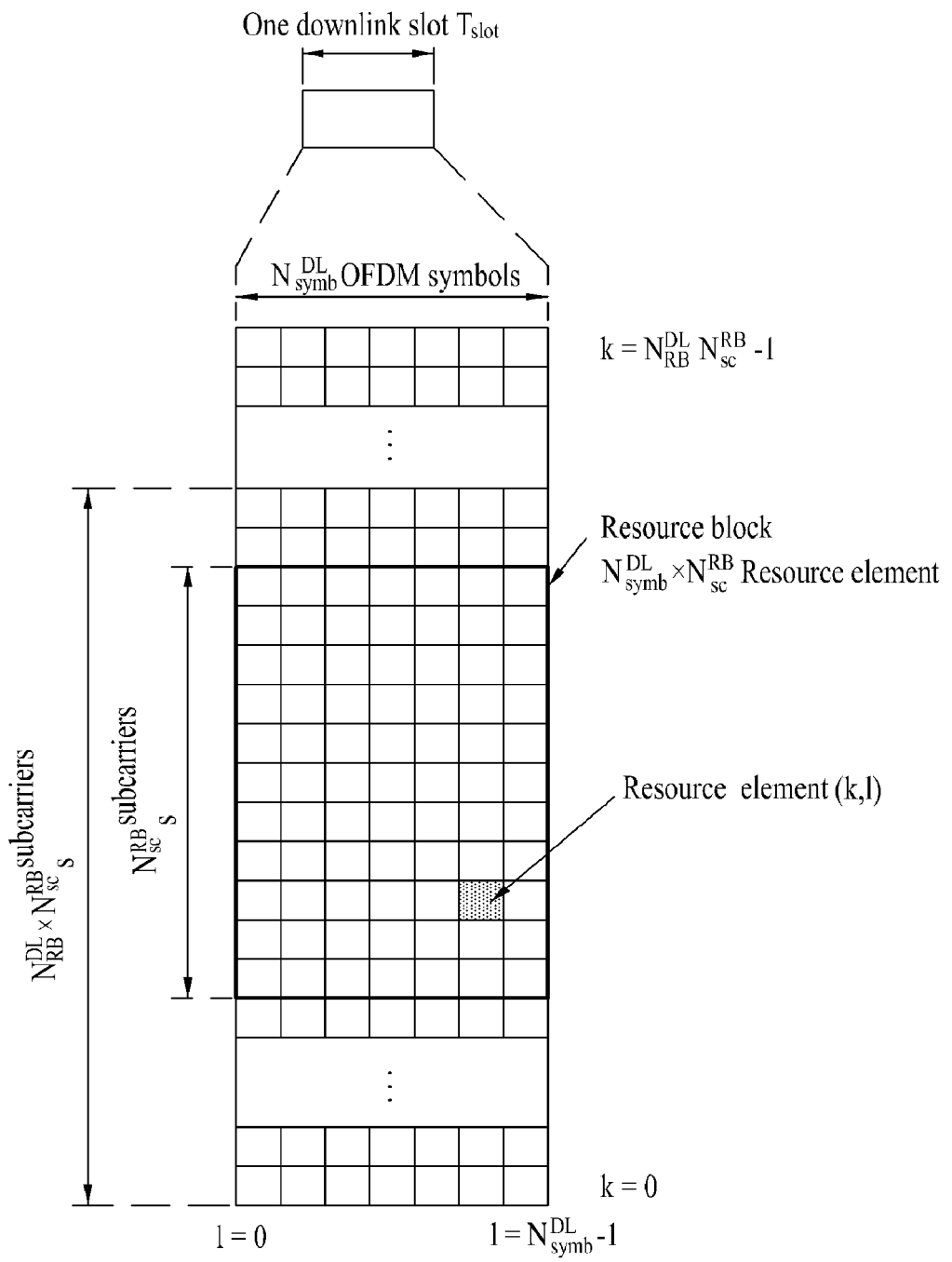
FIG. 5 is a diagram of a DL time-frequency resource grid structure used by the present invention.

FIG. 5 is a diagram of a downlink time-frequency resource grid structure used by the present invention.

A DL signal transmitted in each slot uses a resource grid structure constructed with $N^{DL}_{RB} * N^{RB}_{SC}$ subcarriers and $N^{DL}_{symb}$ OFDM (Orthogonal Frequency Division Multiplexing) symbols. In this case, '$N^{DL}_{RB}$' indicates the number of resource blocks (RBs) in DL, '$N^{RB}_{SC}$' indicates the number of subcarriers constructing one RB, and '$N^{DL}_{symb}$' indicates the number of OFDM symbols in one DL slot. A size of '$N^{DL}_{RB}$' varies in accordance with a DL transmission bandwidth configured within a cell and should meet '$N^{min,DL}_{RB} \leq N^{DL}_{RB} \leq N^{max,DL}_{RB}$'. In this case, '$N^{min,DL}_{RB}$' is a smallest DL bandwidth supported by a wireless communication system and '$N^{max,DL}_{RB}$' is a greatest DL bandwidth supported by the wireless communication system. It may become '$N^{min,DL}_{RB}=6$' and '$N^{max,DL}_{RB}=110$', by which the present example is non-limited. The number of the OFDM symbols included in one slot can vary in accordance with a length of a CP (cyclic prefix) and an interval of subcarrier. In caser of multi-antennal transmission, one resource grid can be defined for each antenna port.

Each element within the resource grid for each antenna port is called a resource element (hereinafter abbreviated RE) and is uniquely identified by an index pair (k, l) within a slot. In this case, 'k' is an index in a frequency domain and 'l' is an index in a time domain. The 'k' has a value selected from '$0, \ldots, N^{DL}_{RB} N^{RB}_{SC} - 1$' and the 'l' has a value selected from '$0, \ldots, N^{DL}_{symb} - 1$'.

The resource block shown in FIG. 5 is used to describe the mapping relation between a prescribed physical channel and resource elements. Resource blocks can be classified into physical resource blocks (PRBs) and virtual resource blocks (VRBs). One PRB can be defined by $N^{DL}_{symb}$ contiguous OFDM symbols in time domain and $N^{RB}_{SC}$ contiguous subcarriers in frequency domain. In this case, '$N^{DL}_{symb}$' and '$N^{RB}_{SC}$' can be given as shown in Table 3. Hence, one PRB is constructed with '$N^{DL}_{symb} \times N^{RB}_{SC}$' resource elements. One PRB corresponds to one slot in time domain and also corresponds to 180 kHz in frequency domain, by which the present example is non-limited.

TABLE 3

| Configuration | | $N_{sc}^{RB}$ | $N_{symb}^{DL}$ |
|---|---|---|---|
| Normal cyclic prefix | Δf = 15 kH | 12 | 7 |
| Extended cyclic prefix | Δf = 15 kH | | 6 |
| | Δf = 7.5 kH | 24 | 3 |

PRB has a value ranging 0 to '$N^{DL}_{RB}-1$' in frequency domain. The relation between the PRB number ($n_{PRB}$) in frequency domain and the resource element (k, l) in one slot satisfies $$n_{PRB} = \left\lfloor \frac{k}{N_{sc}^{RB}} \right\rfloor ..$$

In this case, a size of the VRB is equal to that of PRB. The VRB can be defined in a manner of being categorized into a localized VRB (hereinafter abbreviated LVRB) and a distributed VRB (hereinafter abbreviated DVRB). For the VRB of each type, a single VRB number '$n_{VRB}$' is allocated to a pair of VRBs in two slots within one subframe.

The VRB may have a size equal to that of the PRB. VRBs of two types may be defined as follows. First of all, the first type is the localized VRB (LVRB). And, the second type is the distributed VRB (DVRB). For the VRB of each of the types, a pair of VRBs are allocated across two slots of one subframe with a single VRB index (hereinafter named a VRB number). In particular, one index selected from the group consisting of 0 to '$N^{DL}_{RB}-1$' is allocated to $N^{DL}_{RB}$ VRBs belonging to a first one of the two slots constructing one subframe. And, one index selected from the group consisting of 0 to '$N^{DL}_{RB}-1$' is allocated to $N^{DL}_{RB}$ VRBs belonging to a second one of the two slots constructing one subframe as well.

As mentioned in the foregoing description with reference to FIGS. 3 to 5, the radio frame structure, the DL and UL subframes, the downlink time-frequency resource grid structure and the like may be applicable between an eNode B and a relay node.

In the following description, a process for an eNode B to send PDCCH to a user equipment in downlink is explained. First of all, an eNode B determines a PDCCH format in accordance with a DCI (downlink control information) which is to be sent to a user equipment and then attaches a CRC (cyclic redundancy check) to a control information. In this case, the CRC is masked with a unique identifier, which will be called a radio network temporary identifier (hereinafter abbreviated RNTI), in accordance with an owner or usage of PDCCH. If the PDCCH is provided for a specific user equipment, the CRC can be masked with a unique identifier of a user equipment, e.g., C-RNTI (cell-RNTI). If the PDCCH is provided to a paging message, the CRC can be masked with a paging indication identifier, e.g., P-RNTI (paging-RNTI). If the PDCCH is provided for a system information, the CRC can be masked with a system information identifier, e.g., SI-RNTI (system information-RNTI). In order to indicate a random access response which is the response to a transmission of a random access preamble of a user equipment, the CRC can be masked with RA-RNTI (random access-RNTI). Table 4 shows examples of an identifier that masks PDCCH.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If C-RNTI is used, PDCCH carries a control information for a corresponding specific user equipment. If a different RNTI is used, PDCCH carries a shared control information received by all or a plurality of user equipments within a cell. The eNode B generates a coded data by performing a channel coding on the CRC attached DCI. The bas station then performs a rate matching according to the number of CCEs allocated to the PDCCH format. subsequently, the eNode B generates modulated symbols by modulating the coded data. Thereafter, the eNode B maps the modulated symbols to the physical resource elements.

R-PDCCH (relay-physical downlink control channel) used by the present invention may be used to mean a backhaul physical downlink control channel for a relay transmission from an eNode B to a relay node. And, R-PUCCH (relay-physical uplink control channel) used by the present invention may be used to mean a backhaul physical uplink control channel for a relay transmission to an eNode B from a relay node. R-PDSCH (relay-physical downlink shared channel) may be used to mean a backhaul downlink physical data/shared channel for a relay transmission. And, R-PUSCH (relay-physical uplink shared channel) may be used to mean a backhaul uplink physical data/shared channel for a relay transmission.

In the following description, a relay node type is explained. Regarding a band (or spectrum) use of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment is communicating with a network through a relay node. And, the 'non-transparent' may mean a case that a user equipment is able to recognize whether the user equipment is communicating with a network through a relay node.

Regarding controls of a relay node, relay nodes may be classified into one relay node configured as a part of a donor cell and another relay node capable of controlling a cell by itself.

Although the relay node configured as a part of the donor cell may have a relay node identity (ID), the relay node does not have a cell identity of its own. If at least one portion of RPM (Radio Resource Management) is controlled by a base station having the donor cell belong thereto (despite that the rest of the RPM is located at the relay node), the above-mentioned relay node may be considered as a relay node (RN) configured as a part of the donor cell. Preferably, this relay node may be able to support a legacy user equipment. For example, smart repeaters, decode-and-forward relay nodes, a variety of L2 ($2^{nd}$ layer) relay nodes, and type-2 relay nodes may belong to the category of the above-mentioned relay node.

Regarding a relay node configured to control a cell by itself, this relay node controls one or more cells, a unique physical layer cell identity is provided to each cell controlled by the relay node, and the same RPM mechanism may be usable. In aspect of a user equipment, there is no difference between accessing a cell controlled by a relay node and accessing a cell controlled by a general base station. Preferably, a cell controlled by the above-mentioned relay node may be able to support a legacy user equipment. For example, a self-backhauling RN, an L3 (3rd layer) relay node, a type-1 relay node, and a type-1a relay node may belong to the category of the above-mentioned relay node.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may be able to transmit a synchronization channel of its own, a reference signal and the like. In case of a single-cell operation, a user equipment may directly receive scheduling information and HARQ feedback from a relay node and may be able to transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance thereof can be enhanced.

The type-1a relay node is operated in the out-band, and has the same features as those of the type-1 relay node. Operation of the type-1a relay node may be configured to minimize (or eliminate) the influence on L1 ($1^{st}$ layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it may not transmit CRS and PDCCH at least.

Meanwhile, although a relay node used by the present invention is assumed as an in-band relay node incapable of bi-directional transmission and reception on the same band at the same time, the relay node may be non-limited by the in-band relay node. In order for a relay node to operate in in-band, prescribed resources in time-frequency space must be reserved for a backhaul link and these resources may be configured not be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time.). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission is performed on a downlink frequency band, and a backhaul uplink transmission is performed on an uplink frequency band. Regarding the backhaul link multiplexing by TDD, a backhaul downlink transmission is performed in a downlink subframe of a base station or a relay node, and a backhaul uplink transmission is performed in an uplink subframe of the base station or the relay node.

In case of an in-band relay node, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on/under the ground).

As a solution for the above signal interference problem, it may be able to enable a relay node not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 6:
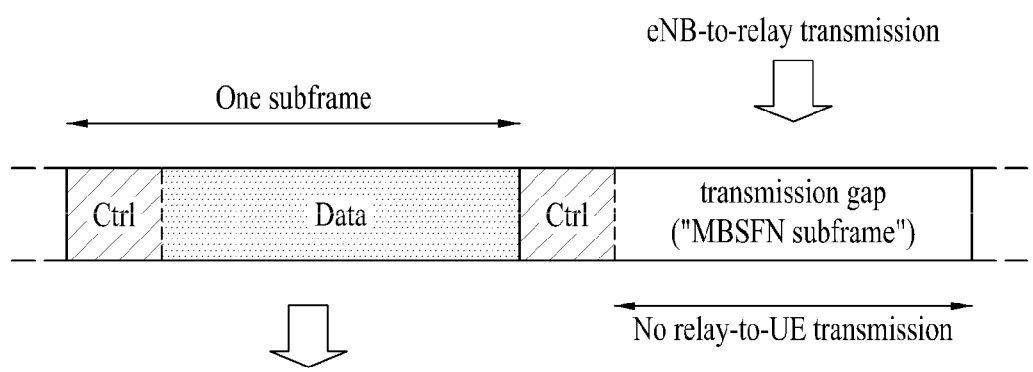
FIG. 6 is a diagram for one example of a fake MBSFN subframe configuration for a relay node backhaul link in LTE-A system.

FIG. 6 is a diagram for one example of a fake MBSFN subframe configuration for a relay node backhaul link in LTE-A system.

Referring to FIG. 6, a region 'Ctrl' is a region for transmitting control information a user equipment should receive all the time. And, since a part following the region 'Ctrl' is MBSFN subframe, the user equipment does not perform an operation of receiving CRS or another random signal. Through this corresponding gap interval, an eNode B transmits backhaul data to a relay node. And, the eNode B transmits control information for the relay node, which is called R-PDCCH, through this region. The eNode B transmits resource allocation information of backhaul data in DL through this control information transmission.

The legacy 3GPP LTE Release 8 (or Release 9) system is based on transmission and reception on a single carrier band based on a scalable band size. Yet, the LTE-A system may be able to support DL transmission from a cell or eNode B to a user equipment using a frequency-domain resource (i.e., subcarrier or physical resource block (PBR)) on at least one carrier band for a same time-domain resource (i.e., subframe unit). Likewise, a random user equipment may be able to support UL transmission to a cell or eNode B using a frequency-domain resource (i.e., subcarrier or physical resource block (PRB)) on at least one carrier band in a same time-domain resource (i.e., subframe unit). They are called downlink carrier aggregation and uplink carrier aggregation. Configurations of physical layer (PHY) and layer 2 (MAC) for transmission on a plurality of UL or DL carrier bands assigned in aspect of a random cell or user equipment may be represented as FIG. 7 or FIG. 8.

Figure 7:
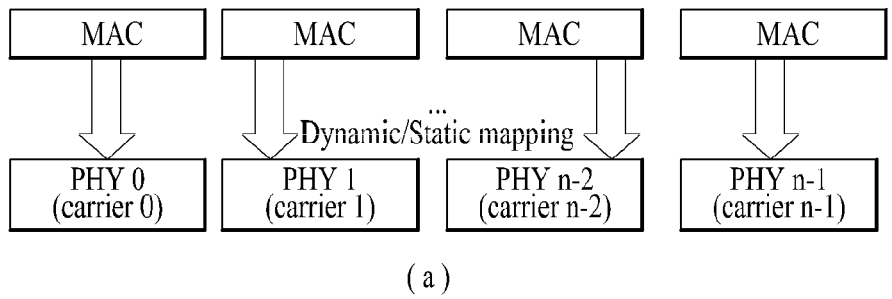
FIG. 7 (a) is a diagram to describe a concept for a plurality of MACs to manage multiple carriers in eNode B and FIG. 7 (b) is a diagram to describe a concept for a plurality of MACs to manage multiple carriers in a user equipment.
Figure 7:
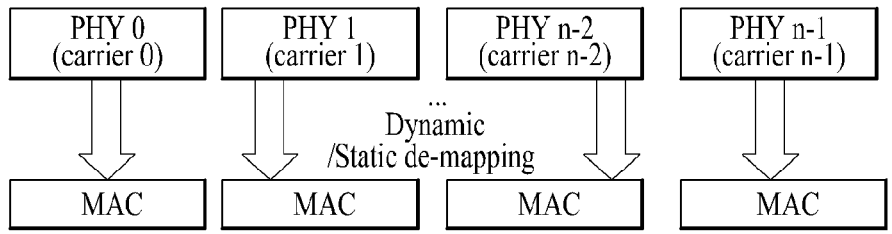

FIG. 7 (*a*) is a diagram to describe a concept for a plurality of MACs to manage multiple carriers in eNode B and FIG. 7 (*b*) is a diagram to describe a concept for a plurality of MACs to manage multiple carriers in a user equipment.

Referring to FIG. 7 (*a*) and FIG. 7 (*b*), MAC may be able to control each carrier by 1:1. In a system supportive of a plurality of carriers, each of the carriers may be available contiguously or non-contiguously. This may be applicable to UL/DL irrespectively. TDD system is configured to manage and operate N carriers each of which includes DL and UL transmissions, while FDD system is configured to manage and operate multiple carriers for each of UL and DL. In case of the FDD system, an asymmetric carrier aggregation, which differs in the number of carriers aggregated in UL/DL and/or a bandwidth of carrier therein, can be supported.

Figure 8:
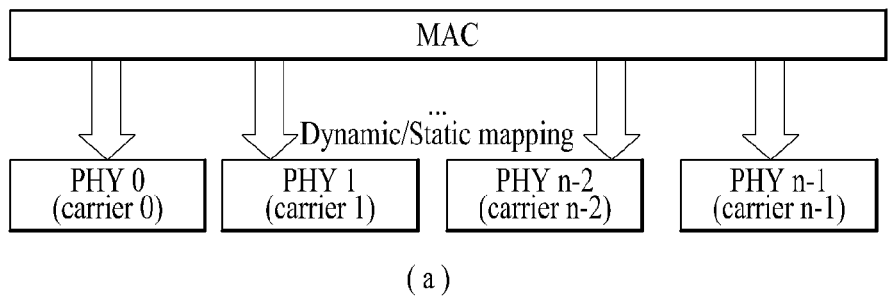
FIG. 8 (a) is a diagram to describe a concept for one MAC to manage multiple carriers in eNode B and FIG. 8 (b) is a diagram to describe a concept for one MAC to manage multiple carriers in a user equipment.
Figure 8:
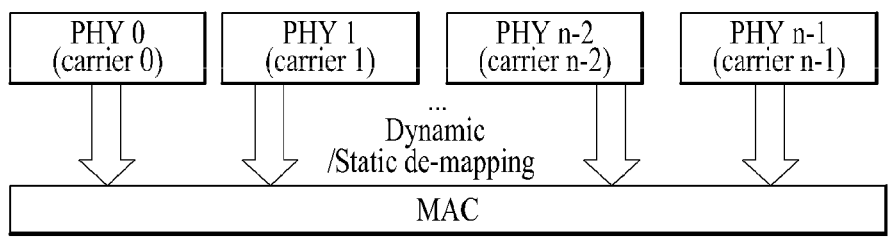

FIG. 8 (*a*) is a diagram to describe a concept for one MAC to manage multiple carriers in eNode B and FIG. 8 (*b*) is a diagram to describe a concept for one MAC to manage multiple carriers in a user equipment.

Referring to FIG. 8 (*a*) and FIG. 8 (*b*), one MAC performs transmission and reception by managing and operating at least one or more frequency carriers. Since the frequency carriers managed by one MAC need not be contiguous with each other, it is advantageous in that resource management can be performed more flexibly. In FIG. 8 (*a*) or FIG. 8 (*b*), one PHY may mean one component carrier for clarity. In this case, it is not mandatory for one PHY to mean an independent RF (radio frequency) device. Generally, one independent RF device means one PHY. Alternatively, one RF device may include one or more PHYs.

A series of physical downlink control channels (PDCCHs), which carry control informations of L1/L2 control signaling generated from a packet scheduler of MAC layer to support the configuration shown in FIG. 8 (*a*) or FIG. 8 (*b*), may be transmitted in a manner of being mapped to physical resource within a separate component carrier. In doing so, PDSCH unique to an individual user equipment or PDCCH for channel assignment related to PUSCH (physical uplink shared channel) transmission or grant related control information may be generated as PDCCH discriminated by being encoded in a manner of being sorted by component carrier that carries a corresponding physical shared channel. This may be represented as separate coded PDCCH. Alternatively, control informations for physical shared channel transmission of multiple component carriers may be transmitted in a manner of being configured into one PDCCH, which is represented as joint coded PDCCH.

An eNode B may have a connection configured to transmit PDCCH and/or PDSCH for performing control information and data transmissions suitable for a situation unique to a specific user equipment or relay node in order to support UL or DL carrier aggregation or may be able to assign component carriers that become objects of measurement and/or reporting as a preparation process for performing the configuration of the connection for the PDCCH and/or PDSCH transmission. This may be represented as component carrier assignment in accordance with a random purpose. In doing so, the eNode B may be able to transmit the control information by RRC signaling (e.g., UE-specific RRC signaling, RN-specific RRC signaling, etc.) unique to a series of UE or RN in accordance with dynamics of a control in case of controlling the component carrier assignment information by L3 RRM (radio resource management), or may be able to transmit the control information on a series of PDCCHs by L1/L2 control signaling or a series of dedicated physical control channels for the present control information only.

Alternatively, in case that the component carrier assignment information is controlled by a packet scheduler, the control information may be transmitted on a series of PDCCHs by L1/L2 control signaling, a series of dedicated physical control channels for a transmission of the present control information, or PDCCH of L2 MAC message type.

As mentioned in the foregoing description, a relay node is introduced to the LTE-A system to solve the shadow zone problem. In this case, the relay node supports the networking between an eNode B and a user equipment and may be able to relay UL/DL transmission packets. Moreover, in order to increase the data throughput on a wideband, the carrier aggregation technology, in which UL or DL transmission/reception is performed by a random eNode B, UE or RN using a plurality of carriers having a randomly designated band simultaneously, is introduced to the LTE-A system.

According to the present invention, in a CA supportive wireless communication system including a relay node for the networking between an eNode B and a user equipment, system transmission resource configuration and allocation (or assignment) to support combination and/or adaptation of the introduced relay node and carrier aggregation are described. In the following description of the present invention, LTE-A system evolved from LTE system is described as one example of an advanced OFDM based mobile communication system, by which the present invention may be non-limited. And, the description of the present invention may be applicable to other mobile communication systems.

As a method of supporting a relay node (RN) in a random cell or eNode B area of a wireless communication system, there is a multiplexing of a backhaul link between an eNode B and a relay node and an access link between the relay node and a user equipment. In particular, if the CA (carrier aggregation) transmission scheme is applied to the eNode B and the relay mode, a method of resource distribution between the backhaul link and the access line and a corresponding control channel configuring method are described as follows.

Figure 9:
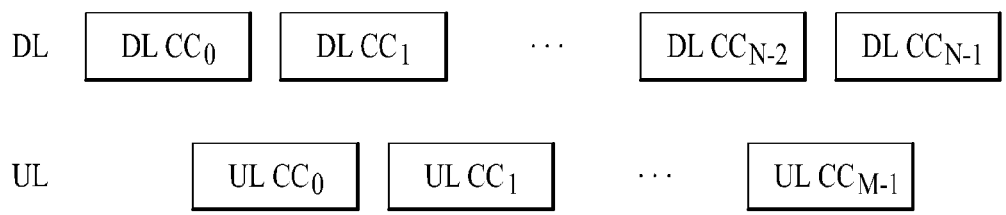
FIG. 9 is a diagram for the concept of configuration with a plurality of DL/UL component carriers (CCs) configured by an eNode B in LTE-A system.

FIG. 9 is a diagram for the concept of configuration with a plurality of DL/UL component carriers (CCs) configured by an eNode B in LTE-A system.

FIG. 9 shows one example that the number of downlink component carriers (DL CCs) and the number of uplink component carriers (UL CCs) are set to N and M, respectively. Basic downlink component carriers (DL CCs) and basic uplink component carriers (UL CCs), which are assigned by a random eNode B, are illustrated. For instance, the number of downlink component carriers is set to N and the number of uplink component carriers is set to N. In this case, the number of downlink component carriers may be set equal to or different from the number of uplink component carriers.

According to the present invention, it is defined a specific UL CC supportive of backhaul UL transmission between a random relay node and an eNode B and a DL CC carrying PUSCH (or R-PUSCH) via the corresponding UL CC are in relation of linkage with each other. In particular, referring to FIG. 9, for example, if UL $CC_1$ and DL $CC_1$ are set to backhaul dedicated CCs, respectively and UL grant for backhaul PUSCH transmission on the UL $CC_1$ is transmitted on PDCCH of the DL $CC_1$, it may be able to define that the UL $CC_1$ and DL $CC_1$ are in linkage relation. In the following description, how to configure a downlink/uplink component carrier (DL/UL CC) type in a multicarrier system supportive of carrier aggregation is explained. This configuration of the DL/UL CC type may be performed by a processor 155 of an eNode B or a processor 180 of a relay node.

(First Embodiment (Cell-specific Component Carrier (CC) Configuring Method 1)

A $1^{st}$ embodiment of the present invention relates to a method for an eNode B to configure a component carrier cell-specifically.

Figure 10:
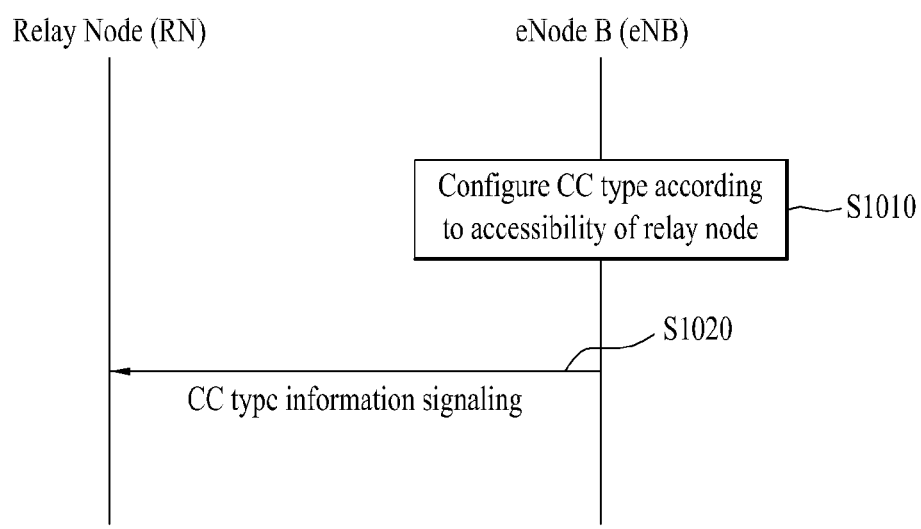
FIG. 10 is a diagram for one example of a process for configuring DL/UL CC and sharing the configured DL/UL CC.

FIG. 10 is a diagram for one example of a process for configuring DL/UL CC (downlink/uplink component carrier) and sharing the configured DL/UL CC.

Referring to FIG. 10, an eNode B may be able to configure three kinds of types of configured DL/UL CCs in accordance with accessibility of a relay node per CC [S1010]. In particular, the three kinds of the component carrier (CC) types may include a relay dedicated CC type, a CC type accessible by both a relay node and a user equipment, and a UE-only accessible CC type.

As a $1^{st}$ type component carrier (CC), the eNode B may be able to configure a specific CC with a relay dedicated CC. The $1^{st}$ type CC is the CC inaccessible by user equipment within a corresponding macro eNode B (or cell). The relay dedicated CC is the CC that supports a backhaul link for a communication between an eNode B and a relay node only.

If a user equipment attempts an access to a relay dedicated CC, this access attempt of the user equipment may be cut off by a higher layer through an access control (e.g., an access barring, etc.) of an initial entry process or by a physical layer through a modification (e.g., introduction of R-P-SCH/R-S-SCH and R-P-BCH) of P-SCH/S-SCH or P-BCH transmission structure. Alternatively, a system or an eNode B may be able to signal a user equipment, which attempts an initial entry into a relay dedicated CC, to redirect to a component carrier (CC) of a different type (e.g., CC supportive of both a relay node access and a user equipment access, CC supportive of a user equipment access without supporting a relay node access).

Alternatively, in order to basically prevent every communication entity to initially enter a relay dedicated CC, an eNode B may not transmit P-SCH/S-SCH (R-P-SCH/R-S-SCH) or P-BCH (or R-P-BCH). In doing so, if a relay node attempts to perform DL/UL backhaul link transmission/reception through the corresponding relay dedicated CC, the relay node performs an initial entry through the type of the CC accessible by both a relay node and a user equipment and may then perform a carrier switching to the relay dedicated CC, or may be able to support the backhaul link transmission/reception on the corresponding relay dedicated CC by carrier aggregation. In this case, limitation may be put on the relay dedicated CC to support PDCCH only as L1/L2 DL control channel for a relay node or both of PDCCH and R-PDCCH.

As a $2^{nd}$ type component carrier (CC), an eNode B may be able to configure a specific CC with a relay compatible CC accessible by both a relay node and a user equipment. The eNode B supports an access link to the user equipment within a cell through the relay compatible CC accessible by the corresponding relay node and the corresponding user equipment both (i.e., signals are directly transmitted and received between the eNode B and the user equipment in direct) and may be able to support a backhaul link to the relay node. Moreover, the relay compatible CC accessible by both of the relay node and the user equipment may be able to support transmission and reception on every channel defined by LTE-A.

As a $3^{rd}$ type component carrier (CC), an eNode B may be able to configure a specific CC with a non-relay compatible CC accessible not by a relay node but by a user equipment. The $3^{rd}$ type CC, which is the component carrier inaccessible by relay nodes within a corresponding macro eNode B (or cell), supports a direct link for a communication with a macro user equipment only. If a relay node attempt an access to the non-relay compatible CC enabling an access by s user equipment only, the attempt may be cut off by an access control (e.g., an access barring) of an initial entry process. Alternatively, a system or eNode B may be able to signal a relay node attempting an initial entry to redirect to a different type CC (e.g., a relay compatible CC accessible by both a relay node and a user equipment, a non-relay compatible CC accessible by a user equipment only, etc.). Unlike the relay compatible CC accessible by both a relay node and a user equipment, the non-relay compatible CC does not support a transmission on a relay dedicated physical channel (e.g., R-PDCCH, R-PD-SCH, R-PUCCH, R-PUSCH, etc.).

Thus, the eNode B may be able to set each of the DL/UL CCs to have one of the three kinds of the CC types separately.

The eNode B may be able to cell-specifically configure the CC type settings of the DL/UL CCs in the step S1010.

The eNode B may be able to signal CC type information on each of the CCs to all relay nodes and/or user equipments within the cell by cell-specific higher layer signaling (e.g., cell-specific RRC (radio resource control) signaling) [S1020]. In doing so, the cell-specific higher layer signaling, which indicates the CC type information on each of the DL/UL CCs, may be identically transmitted on the DL CCs of all types in form of SIB (system information block). On the other hand, the eNode B may perform the cell-specific higher layer signaling on the relay compatible CC accessible by both of the relay node and the user equipment and the relay dedicated CC accessible by the relay node only except the non-relay compatible CC accessible by the user equipment only [S1020].

The eNode B may be able to perform the signaling of a different type for transmitting the type information of each of the CCs. In particular, the eNode B may be able to transmit the type information to the relay node and/or the user equipment separately by RN-specific higher layer signaling (e.g., RN-specific RRC signaling, etc.) or RN-specific L1/L2 control signaling [S1020].

In consideration of at least one of the number of relay nodes in the macro cell, the number of user equipments in the macro cell, backhaul traffic load and UE traffic load, the eNode B may be able to randomly set, change or update the CC type, which is mentioned in the foregoing description of the $1^{st}$ embodiment of the present invention, for each of the DL/UL CCs.

The relay node may receive and know the information on the DL/UL CC previously assigned to the corresponding relay node by the eNode B through the higher layer signaling or the like [not shown in FIG. 10]. In this case, the information on the DL/UL CC may include an index of the corresponding DL/UL CC.

For instance, assume that the eNode B configures DL CCs with DL $CC_0$, DL $CC_1$, DL $CC_2$, DL $CC_3$ and DL $CC_4$, and also configures UL CCs with UL $CC_0$, UL $CC_1$, UL $CC_2$ and UL $CC_3$. And, the eNode B configures a CC type for each of the DL CCs including DL $CC_0$, DL $CC_1$, DL $CC_2$, DL $CC_3$, and DL $CC_4$ in a manner of configuring the CC type of each of the UL CCs including UL $CC_0$, UL $CC_1$, UL $CC_2$, and UL $CC_3$.

And, the eNode B may assign DL CCs including DL $CC_0$, DL $CC_1$, DL $CC_2$ and DL $CC_3$ and UL CCS including UL $CC_0$, UL $CC_1$ and UL $CC_2$ and may then signal the assigned CCs to a specific relay node. If so, a processor 255 of the specific relay node may be able to obtain CC type informations on the assigned DL CCs including DL $CC_0$, DL $CC_1$, DL $CC_2$ and DL $CC_3$ and the UL CCs including UL $CC_0$, UL $CC_1$ and UL $CC_2$. For instance, if the eNode B configures the DL $CC_0$ and the UL $CC_0$ as the relay dedicated CCs, the relay node may be able to transceive signals with the eNode B only. A user equipment may not be able to transceive a signal on the DL $CC_0$ and the UL $CC_0$. In this case, if the specific relay node performs an initial access configuring process or an initial connection re-access process via the DL $CC_0$ among the DL $CC_0$, DL $CC_1$, DL $CC_2$ and DL $CC_3$, which are assigned to the specific relay node by the eNode B, for instance, the DL $CC_0$ may be named a primary cell (PCell) or the like and each of the remaining DL $CC_1$, DL $CC_2$ and DL $CC_3$ may be named a second cell (SCell) or the like.

Second Embodiment (Cell-specific Component Carrier (CC) Configuring Method 1)

Unlike the above-described $1^{st}$ embodiment of the present invention, an eNode B may not put limitation on accessibility of a relay node or macro user equipment to all configured DL/UL CCs.

Figure 11:
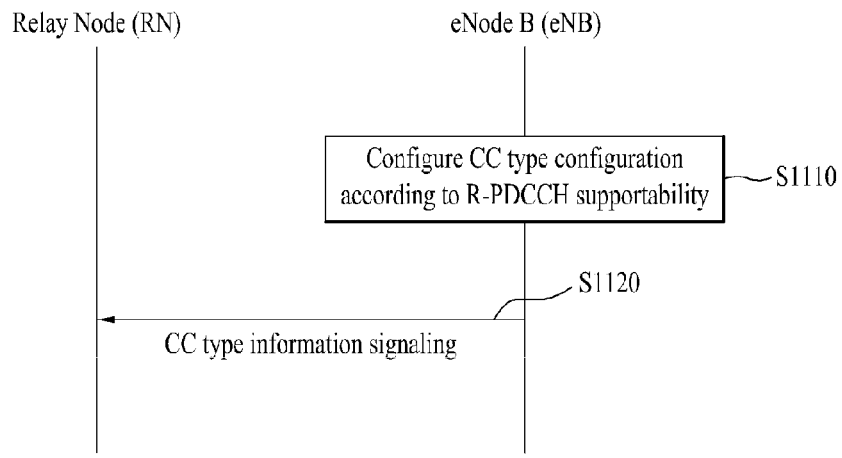
FIG. 11 is a diagram for another example of a process for configuring DL/UL CC and sharing the configured DL/UL CC.

FIG. 11 is a diagram for another example of a process for configuring DL/UL CC and sharing the configured DL/UL CC.

Referring to FIG. 11, according to a $2^{nd}$ embodiment of the present invention, an eNode B may be able to configure DL CCs of two kinds of types in accordance with whether R-PDCCH, which is a DL control channel only for a relay node, is supported [S1110].

As a $1^{st}$ type CC (component carrier), the eNode B may be able to configure R-PDCCH supportable CC. The R-PDCCH supportable CC is the component carrier supportive of a transmission of such a DL control channel for a relay node as R-PDCCH. The relay node may be able to receive the R-PDCCH through the corresponding CC. In this case, the relay node may be able to receive L1/L2 control information via PDCCH or R-PDCCH in accordance with a possibility of PDCCH reception of the eNode B.

As a $2^{nd}$ type CC (component carrier), the eNode B may be able to configure R-PDCCH non-supportive CC (i.e., R-PDCCH blocked CC). The R-PDCCH blocked CC is the CC incapable of supporting a transmission of such a control channel for a relay node only as R-PDCCH. If the relay node attempts to receive a backhaul DL link via the R-PDCCH blocked CC, the relay node should be able to receive PDCCH of the eNode B and may be able to receive L1/L2 DL control information via PDCCH only.

Thus, the eNode B may be able to set each of the DL/UL CCs to one of the 2 kinds of CC types separately. The eNode B may be able to cell-specifically configure the CC type settings of the DL/UL CCs in the step S1110.

The eNode B may be able to signal, to all relay nodes and/or user equipments in a cell, the information on the CC type of each of the CCs by a cell-specific higher layer signaling (e.g., cell-specific RRC (radio resource control) signaling) [S1120]. In doing so, the cell-specific higher layer signaling for indicating the CC type information on each of the DL/UL CCs may be identically transmitted as system information block (SIB) on one of the DL CCs of all kinds of the types [S1120].

As another method for the eNode B to transmit the type information on each CC, the eNode B may be able to transmit the type information to an individual relay node and/or user equipment by RN-specific higher layer signaling (e.g., RN-specific RRC signaling) or RN-specific L1/L2 control signaling [S1120].

In consideration of at least one of the number of relay nodes in the macro cell, the number of user equipments in the macro cell, backhaul traffic load and UE traffic load, the eNode B may be able to randomly set, change or update the CC type, which is mentioned in the description of the $2^{nd}$ embodiment of the present invention, of each of the DL/UL CCs.

Like the $1^{st}$ embodiment, the relay node may receive and know the information on the DL/UL CC previously assigned to the corresponding relay node by the eNode B through the higher layer signaling or the like [not shown in FIG. 11]. In this case, the information on the DL/UL CC may include an index of the corresponding DL/UL CC. For instance, assume that the eNode B configures DL CCs with DL $CC_0$, DL $CC_1$, DL $CC_2$, DL $CC_3$ and DL $CC_4$, and also configures UL CCs with UL $CC_0$, UL $CC_1$, UL $CC_2$ and UL $CC_3$.

And, the eNode B configures a CC type for each of the DL CCs including $DL\ CC_0$, $DL\ CC_1$, $DL\ CC_2$, $DL\ CC_3$, and $DL\ CC_4$ in a manner of configuring the CC type of each of the UL CCs including $UL\ CC_0$, $UL\ CC_1$, $UL\ CC_2$, and $UL\ CC_3$. Moreover, the eNode B may assign DL CCs including $DL\ CC_0$, $DL\ CC_1$, $DL\ CC_2$ and $DL\ CC_3$ and UL CCS including $UL\ CC_0$, $UL\ CC_1$ and $UL\ CC_2$ for a $1^{st}$ relay node and may then signal the assigned CCs to the $1^{st}$ relay node. If so, the $1^{st}$ relay node may be able to obtain CC type informations on the assigned DL CCs including $DL\ CC_0$, $DL\ CC_1$, $DL\ CC_2$ and $DL\ CC_3$ and the UL CCs including $UL\ CC_0$, $UL\ CC_1$ and $UL\ CC_2$ and know that R-PDCCH is carried on which CC. In this case, if the specific relay node performs an initial access configuring process or an initial connection re-access process via the $DL\ CC_0$ among the $DL\ CC_0$, $DL\ CC_1$, $DL\ CC_2$ and $DL\ CC_3$, which are assigned to the specific relay node by the eNode B, for instance, the $DL\ CC_0$ may be named a primary cell (PCell) or the like and each of the remaining $DL\ CC_1$, $DL\ CC_2$ and $DL\ CC_3$ may be named a second cell (SCell) or the like.

Therefore, the relay node may be able to know whether R-PDCCH is transmitted on each of the assigned CCs. If the relay intends to transmit or receive a signal via a backhaul link on R-PDCCH supportable CC, a processor 180 of the relay node may need to read the R-PDCCH in a resource region by performing a blind decoding or a blind searching.

If the relay node intends to transmit or receive a signal via a backhaul DL link on a R-PDCCH blocked CC, the relay node may need to be capable of receiving PDCCH of the eNode B and may be able to receive L1/L2 DL control information via PDCCH only. Therefore, the processor 180 of the relay may need to perform the blind searching or the blind decoding to detect the PDCCH from the corresponding CC.

Third Embodiment (RN-specific Component Carrier (CC) Configuring Method 1)

A $3^{rd}$ embodiment of the present invention relates to a method for a relay node to configure a component carrier (CC) cell-specifically.

Figure 12:
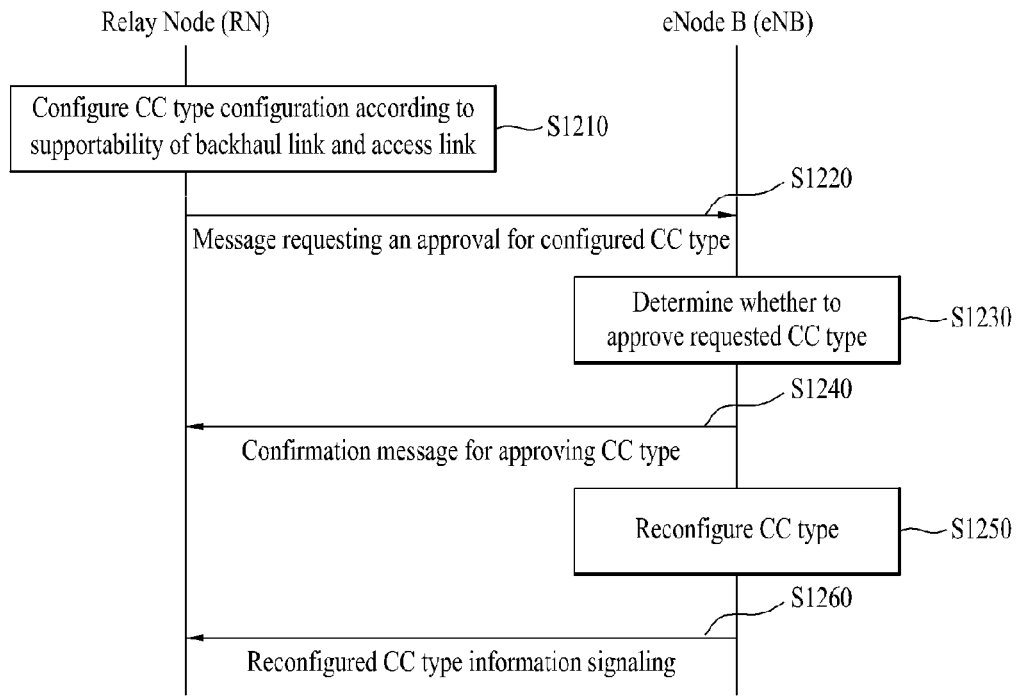
FIG. 12 is a diagram for a further example of a process for configuring DL/UL CC and sharing the configured DL/UL CC.

FIG. 12 is a diagram for a further example of a process for configuring DL/UL CC and sharing the configured DL/UL CC.

Referring to FIG. 12, a relay node may be able to configure relay node supportable UL/DL component carriers with CCs of 3 kinds of types of CC in accordance with a setting per CC for a presence or non-presence of a support of a backhaul link to a macro eNode B or a presence or non-presence of a support of an access link to a user equipment [S1210].

As a first type CC, the relay node may be able to configure a specific CC as a backhaul dedicated CC used only for a backhaul link transceiving with the eNode B. The backhaul link CC may not support an access link between the user equipment and the relay node. In particular, the backhaul dedicated CC does not include any physical channel for supporting the access link and the relay node may be able to blank the corresponding CC to the user equipment by transmitting carrier aggregation (CA) configuration information in a manner that information on the corresponding backhaul dedicated CC is not contained in the CA configuration information.

The backhaul dedicated component carrier may be configured only for the relay dedicated CC or the relay compatible CC among the eNode B CC types mentioned in the description of the $1^{st}$ embodiment of the present invention. Meanwhile, the backhaul dedicated CC may be configured with each of the two kinds of the CC types (i.e., R-PDCCH supportable CC and R-PDCCH non-supportable CC) mentioned in the description of the $2^{nd}$ embodiment of the present invention.

As a $2^{nd}$ type CC, the relay node may be able to configure a specific CC as a backhaul/access multiplexed CC, which supports both a backhaul link between the eNode B and the relay node and an access link between the relay and the user equipment. In particular, in the backhaul/access multiplexed CC, as mentioned in the foregoing description, a resource partitioning between a backhaul subframe and an access subframe may apply by TDM scheme using MBSFN subframe to a configuration of the backhaul subframe. Alternatively, in the backhaul/access multiplexed CC supportive of both of the backhaul link and the access link, the backhaul link and the access link may be resource-partitioned by FDM (frequency division multiplexing) scheme or a hybrid scheme of combined TDM and FDM.

In case that the eNode B CC type classification mentioned in the foregoing description of the $1^{st}$ embodiment of the present invention applies, the backhaul/access multiplexed CC, which supports both of the backhaul link and the access link, may be configured for both of the relay dedicated CC supportive of the R-PDCCH transmission and the relay compatible CC accessible by both of the relay node and the user equipment among the CC types mentioned in the description of the $1^{st}$ embodiment of the present invention. If the relay dedicated CC does not support the R-PDCCH transmission, the backhaul/access multiplexed CC supportive of the backhaul link and the access link both may be configured only for the relay compatible CC accessible by both of the user equipment and the relay node.

Meanwhile, in case that the eNode B CC type classification mentioned in the description of the $2^{nd}$ embodiment of the present invention applies, the backhaul/access multiplexed CC supportive of both of the backhaul link and the access link may be configured only for a R-PDCCH supportable CC type.

As a $3^{rd}$ type CC, the relay node may be able to set a specific CC to an access dedicated CC. The access dedicated CC is the CC used only for an access link transceiving with the user equipment UE among the DL/UL CCs supported by the relay node and does not support the backhaul link between the eNode B and the relay node.

In order to support UL/DL backhaul link, it is necessary for the relay node to configure at least one backhaul dedicated CC or backhaul/access multiplexed CC supportive of both a backhaul link and an access link. In the backhaul link, a transmitting method via a carrier aggregation using a plurality of backhaul dedicated CCs and the backhaul/access multiplexed CC supportive of both of the backhaul link and the access link may apply.

As mentioned in the foregoing description, the relay node can become a main body that configures a backhaul dedicated CC supportive of a backhaul link and a backhaul/access multiplexed CC supportive of both a backhaul link and an access link. In this case, the relay node may configure the backhaul dedicated CC or the CC supportive of both of the backhaul link and the access link among DL/UL CCs of the eNode B and may be then able to transmit the configured CC to the eNode B in the form of a request message via a higher layer signaling [S1220].

If so, a processor 155 of the eNode B may be able to determine whether to approve the requested CC type in order to respond to the message from the relay node that requests an approval for the CC type [1230]. If determining to approve the requested CC type, the eNode B may be able to send a message confirming that the requested CC type has been approved, to the relay node [1240].

On the contrary, if determining no to approve the CC type requested by the relay node requested, the processor 155 of the eNode B may be able to reconfigure a CC type [1250]. In doing so, the processor 155 of the eNode B reconfigures an RN-specific CC type for each relay node and may be then able to transmit the reconfigured CC type to the corresponding relay node [S1260].

Alternatively, the eNode B configures an RN-specific CC type (i.e., a backhaul dedicated CC and a backhaul/access multiplexed CC) (an access dedicated CC may be inclusive) among the CCs supportably by the relay node and may be then able to transmit the CC type to the corresponding relay node individually by the RN-specific higher layer signaling.

When an eNode B configures an RN-specific CC type (RN-specific CC type), the eNode B may be able to configure a DL control channel for a corresponding relay node on a CC configured as a backhaul dedicated CC or a backhaul/access multiplexed CC. In particular, in case that the relay node is able to receive R-PDCCH and PDCCH, the eNode B configures a channel for transmitting L1/L2 (Layer 1/Layer 2) DL control information for the corresponding relay node and may be then able to transmit it to the corresponding relay node by the RN-specific higher layer signaling. In this case, a blind search space of the relay node may be determined in accordance with the corresponding L1/L2 DL control channel configuration information. For instance, if L1/L2 DL control channel configuration for a random relay node is configured as PDCCH, the corresponding relay node may be able to perform the blind searching on a PDCCH region only for L1/L2 DL control information reception. For another instance, if L1/L2 DL control channel configuration for a random relay node is configured as R-PDCCH, the corresponding relay node may be able to perform the blind searching on the R-PDCCH region only for L1/L2 DL control information reception. For another instance, if L1/L2 DL control channel configuration for a random relay node is configured as PDCCH and R-PDCCH both, the corresponding relay node may be able to perform the blind searching on both of the PDCCH region and R-PDCCH region for L1/L2 DL control information reception.

An eNode B may be able to map a DL control channel implicitly in accordance with an RN-specific CC type. In particular, if a specific CC is set as a backhaul dedicated CC for a relay node, since the corresponding relay node is capable of receiving PDCCH on the corresponding CC, the corresponding relay node may be able to operate to receive L1/L2 DL control information via PDCCH implicitly. Yet, if a specific CC is set as a backhaul/access multiplexed CC for a relay node, since the corresponding relay node is unable to receive PDCCH on the corresponding CC, the eNode B may enable L1/L2 control information to be transmitted to the corresponding relay node on R-PDCCH.

When a backhaul dedicated CC and a backhaul/access multiplexed CC are configured in a relay node, a cross carrier scheduling may apply between the CC types different from each other. CC for an eNode B to transmit L1/L2 control channel may be named a primary backhaul CC for example. The relay node may be able to receive resource allocation information for R-PDSCH (or R-PUSCH) transmission on the L1/L2 control channel of the corresponding primary backhaul CC. In particular, if a backhaul dedicated CC and a backhaul/access multiplexed CC supportive of both a backhaul link and an access link coexist, the primary backhaul CC may be configured with one of the backhaul dedicated CCs. Therefore, the relay node may be able to receive resource allocation information for R-PDSCH (or R-PUSCH) transmission via the primary backhaul CC configured among the backhaul dedicated CCs. In this case, the resource allocation information for the R-PDSCH (or R-PUSCH) transmission may include scheduling information for the backhaul dedicated CC or scheduling information for the backhaul/access multiplexed CC supportive of both of the backhaul link and the access link. The relay node may receive/transmit DL/UL signal on the backhaul/access multiplexed CC based on control information received via the primary backhaul CC. This is called a cross-carrier scheduling and the cross-carrier scheduling apply to UL in the same manner.

In case that a plurality of backhaul/access multiplexed CCs supportive of backhaul link and access link are configured, backhaul subframe assignment for each of the CCs may be performed independently. In doing so, for the purpose of simple implementation, an independent backhaul subframe assignment may be limited only to the case that backhaul/access multiplexed CCs are symmetric in DL and UL only. Alternatively, the same backhaul subframe assignment may apply to all the backhaul/access multiplexed CCs supportive of backhaul link and access link both.

It may be able to introduce a control signaling method different from a conventional L1/L2 control signaling between an eNode B and a user equipment may be introduced in accordance with RN-specific (i.e., specific to each relay node) CC configuration combination of DL/UL CCs supported by a relay node. In particular, in case that an RN-specific CC is configured in an asymmetric structure between UL and DL in a relay node, the present invention proposes a method of transmitting/receiving UL grant control information for UL data transmission resource allocation from the relay node to an eNode B.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Accordingly, apparatus and method for transmitting and receiving control information in a wireless communication supportive of carrier aggregation may be industrially applicable to various kinds of wireless access systems including 3GPP LTE, LTE-A, IEEE 802 and the like.

What is claimed is:

1. A method of receiving control information at a relay node in a wireless communication system supporting carrier aggregation, the method comprising:

receiving type information of a plurality of downlink component carriers configuring types of each of the plurality of downlink component carriers (CCs) based on whether an R-PDCCH (Relay-PDCCH) corresponding to a relay dedicated downlink control channel is supportable, from an eNode B; and performing a blind searching to detect the R-PDCCH or a physical downlink control channel (PDCCH) based on the type information of the plurality of the downlink component carriers.

2. The method of claim 1, wherein the performing blinding searching further comprising:

performing the blind searching to detect the R-PDCCH from a first downlink component carrier if the first downlink component carrier among the plurality of the downlink component carriers is the downlink component carrier supportive of the R-PDCCH.

3. The method of claim 2, further comprising:

receiving data from the eNode B on the first downlink component carrier based on the R-PDCCH detected from the first downlink component carrier.

4. The method of claim 3, further comprising:

transmitting data to the eNode B on a first uplink component carrier configured in a linkaged relation with the first downlink component carrier based on the R-PDCCH detected from the first downlink component carrier.

5. The method of claim 1, wherein the performing blinding searching further comprising:

performing the blind searching to detect the R-PDCCH from a first downlink component carrier if the fist downlink component carrier among the plurality of the downlink component carriers is the downlink component carrier non-supportive of the R-PDCCH.

6. The method of claim 5, further comprising:

receiving data from the eNode B on the first downlink component carrier based on the PDCCH detected from the first downlink component carrier.

7. A relay node apparatus of receiving control information in a wireless communication system supporting carrier aggregation, the relay node apparatus comprising:

a receiving antenna configured to receive, type information of a plurality of downlink component carriers configuring types of the plurality of downlink component carriers (CCs) based on whether an R-PDCCH (Relay-PDCCH) corresponding to a relay dedicated downlink control channel is supportable, from an eNode B; and a processor configured to perform a blind searching to detect the R-PDCCH or a physical downlink control channel (PDCCH) based on the type information of the plurality of the downlink component carriers.

8. The relay node apparatus of claim 7, wherein the processor further configured to perform the blind searching to detect the R-PDCCH from a first downlink component carrier if the first downlink component carrier among the plurality of the downlink component carriers is the downlink component carrier supportive of the R-PDCCH.

9. The relay node apparatus of claim 8, wherein the receiving antenna further configured to receive data from the eNode B on the first downlink component carrier based on the R-PDCCH detected from the first downlink component carrier.

10. The relay node apparatus of claim 9, further comprising:

a transmitting antenna configured to transmit data to the eNode B on a first uplink component carrier configured in a linkaged relation with the first downlink component carrier based on the R-PDCCH detected from the first downlink component carrier.

11. The relay node apparatus of claim 7, wherein the processor further configured to performs the blind searching to detect the R-PDCCH from a 1st downlink component carrier if the first downlink component carrier among the plurality of the downlink component carries is the downlink component non-supportive of the R-PDCCH.

12. The relay node apparatus of claim 11, wherein the receiving antenna further configured to receive data from the eNode B on the first downlink component carrier based on the PDCCH detected from the first downlink component carrier.

* * * * *